United States Patent [19]

Bursa et al.

[11] Patent Number: 4,537,094
[45] Date of Patent: Aug. 27, 1985

[54] GEAR TRANSMISSION

[75] Inventors: Miloslav Bursa, Brno; Frantisek Musil, Blansko; Ladislav Podmela, Brno, all of Czechoslovakia

[73] Assignee: Prvni brnenska stojirna, koncernovy podnik, Brno, Czechoslovakia

[21] Appl. No.: 466,038

[22] Filed: Feb. 14, 1983

[51] Int. Cl.³ .............................................. F16H 1/28
[52] U.S. Cl. ........................................ 74/804; 74/802
[58] Field of Search ................. 74/804, 802, 805, 797, 74/63, 198; 464/103, 139

[56] References Cited

U.S. PATENT DOCUMENTS

| 128,352 | 6/1872 | Andrews | 74/805 |
| 1,844,471 | 2/1932 | Johnson | 74/804 X |
| 1,862,220 | 6/1932 | Johnson | 74/804 X |
| 4,117,746 | 10/1978 | Pierrat | 74/804 X |
| 4,216,677 | 8/1980 | Tuzson | 74/63 X |
| 4,446,752 | 5/1984 | Shaffer et al. | 74/804 X |

FOREIGN PATENT DOCUMENTS

| 176638 | 1/1979 | Czechoslovakia . |
| 176639 | 1/1979 | Czechoslovakia . |
| 542206 | 1/1932 | Fed. Rep. of Germany | 74/805 |
| 1933131 | 1/1971 | Fed. Rep. of Germany | 74/805 |
| 1957530 | 5/1971 | Fed. Rep. of Germany | 74/804 |

*Primary Examiner*—Allan D. Herrmann
*Assistant Examiner*—Arthur T. Quiray

[57] ABSTRACT

Gear equipment for transferring rotary motion with torques of middle and high values. Between cooperating transmission members having offset parallel axes and confronting corresponding combined transfer grooves there are disposed anti-friction transfer elements in the form of balls. The transfer elements are rotatably disposed in equally angularly relationship in a circle in a guide gear which is rotatably mounted about a fixed axis between the transmission members. The guide cage may have uniformly circularly arranged inserts wherein the transfer elements are rotatably mounted.

6 Claims, 5 Drawing Figures

GEAR TRANSMISSION

This application is related to the application of Podmela et al, Ser. No. 462,446, filed Jan. 31, 1983.

This invention relates to a gear transmission for the transfer and transformation of rotary motion, such equipment being particularly adapted to increase the speed of rotation transmitted to it by a prime mover.

Known gear transmissions achieving such purpose usually include meshing gears, the drive between gears occurring by reason of engagement between the sides (faces and flanks) of the teeth of the respective gears. In such known gear transmissions the ratio between the speeds of rotation of the driving and driven shafts, which is defined as the ratio of the angular speeds of the mating gears, is usually constant, that is, the gearing does not pulsate. In order to meet such requirement of constant speed of the gear ratio, there are employed gears with fairly complicated profiles of the meshing tooth surfaces. In present practice, there are usually employed involute gear systems for both production and operating reasons.

The demands which are now made upon gear drives are constantly increasing. Thus gear transmissions having smaller and smaller dimensions and weight, as well as higher and higher torque outputs, are now being demanded. It is quite impossible to comply with such demands in some cases. One of the consequences of such a situation, for instance, is the necessity of branching of the great output of gear boxes of ships, as well as the gear boxes of rolling mills and of hoisting and other heavy equipment. There are also efforts to utilize other physical principles, for instance, hydraulic jet effects. However, with their utilization there always occurs very disadvantageous frictional effects, which inevitably result in considerable power losses. On the other hand, in systems employing mechanical, direct transformations through the direct transfer of normal reactions in cooperating gear couples, such pronounced frictional losses do not occur.

The possibility of a substantial increase of power transfer parameters, mainly of torques, is offered by rolling gears, wherein the normal reactions in every transmission couple are transferred through anti-friction transmission elements.

In rolling gears of the type sold under the trade name CYCLO the transmission elements are supporting rollers which are disposed in every transmission couple on the transfer pins of one transmission member, and which are in one-sided rolling contact with one wave formed cam of the second transmission member. In a planetary constructional construction of such rolling transmissions, one of the transmission members is a fixed central ring with axially oriented and uniformly arranged transfer pins. The second transmission member, with regard to the maximum compensation of internal forces including twisting moments, includes two kinematically mutually combined satellite cam discs which form an epicycloid-hypocycloidal circuit.

Rolling transmissions of the CYCLO type are really compact gearings, having little weight and dimensions. Further possibilities of increasing the torque outputs and speed parameters of these otherwise very good designs of rolling transmissions, however, are limited, particularly because of the disadvantageous distribution of internal forces.

With rolling toroidal gearing, as well as in the epicyclic rolling gears of the CYCLO type, the driven and driving shafts are disposed coaxially. The transfer elements are in the form of supporting rollers which are in unilateral rolling transmission members. The first transmission member is a globoidal worm, which is disposed on a driving shaft, the second transmission member being a stator rim which is disposed in a toroidal gear box around the globoidal worm. In a toroidal space between the outer circuit of the globoidal worm and the inner circuit of the stator ring there is disposed a carrier ring which is in tight engagement with the driven shaft. On the carrier ring there are uniformly space carrier pins on which there are disposed rotatable satellite wheels on which there are fastened radially arranged transfer pins with turningly located supporting rollers. The rollers intervene between transfer grooves formed on the outer circuit of the globoidal worms and on the internal circuit of the stator ring.

Rugged and compact toroidal gearings make possible a transfer of really high torsional moments, as well as having a good efficiency and a relatively low weight. But the great disadvantage of such toroidal gearings is the great constructional complexity of the satellite wheels and the transfer rollers.

The face rolling gears described in the Czechoslovak Authors' Certificate Nos. 176,638 and 176,639 permit a considerable increasing of the power transfer parameters, particularly of the torques transmitted by the rolling gears. In such constructions the rolling transmission members, on mutually adjoining cooperating front faces provided with face transfer grooves with round antifriction elements, have the mentioned transfer elements in mutual rolling contact with the transmission members. At the same time, the mentioned transfer elements are in an engagement area anti-frictionally placed in the transfer grooves of both transmission members. Outside the engagement area these transfer elements are with clearance placed partly in a transfer channel, which is created in a solid part of the rolling gear and partly in the transfer grooves of the transmission member, which, through its front surface, adjoins the solid part.

A disadvantage of the face rolling gears which are known up to now is the imperfect attaching of the transfer channel to the engagement zone, friction in the transverse channel, and further imperfect and inexact conducting of the transfer elements in the end positions of the transfer grooves.

The present invention has among its objects the improvement of such known rolling gears, particularly those rolling gears for the transfer and transformation of high torque outputs with low and medium speeds of revolution of the moving parts.

The present invention eliminates the majority of the said disadvantages of the above-described known device. According to the invention, between cooperating transmission members and corresponding combined transfer grooves anti-frictionally placed transfer elements are uniformly spaced and turningly located in a guide gear which is turningly arranged on a fixed axis between transmission members. The guide gear consists of a cage uniformly angularly spaced holes, in which there are turningly disposed transfer elements. The guide cage may, in some embodiments thereof, be composed of spaced parallel connected guide plates, such plates having aligned holes in which there are located inserts which form bearing seats for the turningly disposed transfer elements. A number of such embodiments are disclosed in the above referred-to Podmela et al application.

The face rolling gears according to the present invention markedly reduces the noise level and the vibration generated by the transfer elements as they move along the orbit of the transfer grooves on the transmission members, and particularly reduce the shocks arising as the transfer elements move into and out of engagement with the transmission members at the inlet and outlet ends thereof. The rolling gears of the invention also have less frictional losses than those of prior known face rolling gears. The guide cage in the transmission of the invention is accurately guided by reason of its being rotatable about a fixed axis rather than being allowed to float as in the transmission disclosed in the above referred-to Podmela et al application.

The invention will be more particularly understood upon consideration of the accompanying drawings, in which.

Figure 1:
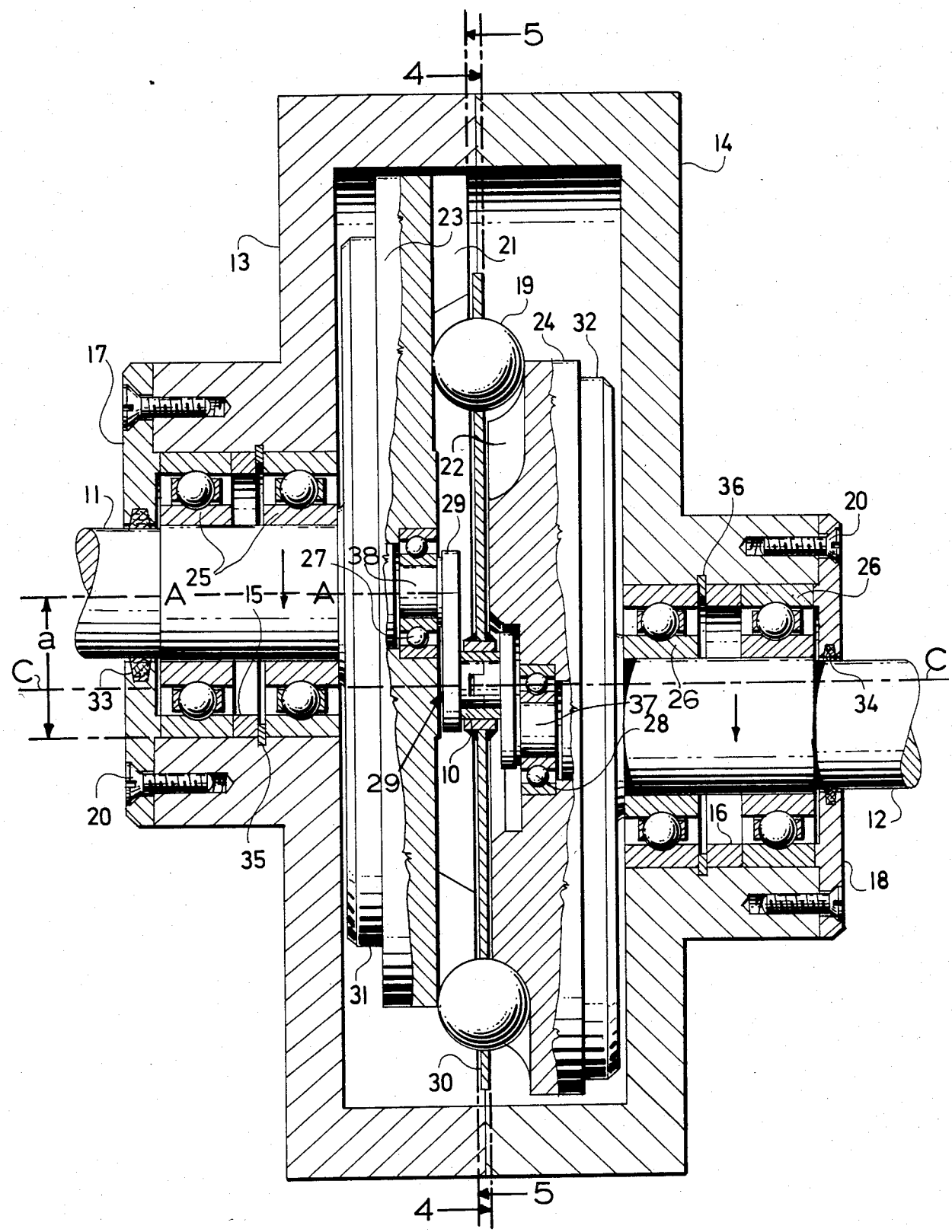
FIG. 1 is a view in axial section through a preferred embodiment of face rolling gear in accordance with the invention.

Turning first to FIG. 1, the rolling gear there shown has a two-part box formed by mutually face connected parts 13 and 14. Within such box there are rotatably mounted two mutually axially offset parallel transmission members 23 and 24. The transmission members 23 and 24 are fixedly connected to flanges 31 and 32 which in turn are fixedly connected to and supported by a driving shaft 11 and a driven shaft 12. The axis A—A of shaft 11 is offset from the axis B—B of shaft 12 by a distance a, as shown in FIG. 1. The shaft 11 is rotatably supported in part 13 of the box by two ball bearings 25 which have a retaining ring 35 and a distance ring 15 disposed between their outer races, as shown. Shaft 12 is similarly rotatably supported in part 14 of the box in two ball bearings 26 which are separated by a retaining ring 26 and a distance ring 16. A cover 17 is secured to a boss on part 13 by machine screws 20, the cover being sealed to the shaft 11 by an annular sealing means 33. The bearings supporting the shaft 12 are similarly provided with a cover 18 secured by machine screws 20 to a hollow boss on the part 14, cover 18 being sealed to the shaft 12 by an annular sealing member 34. Thus lubricant contained within the box 13, 14 is prevented from escape therefrom along either the driving shaft 11 or the driven shaft 12. Each of the covers 17 and 18 is provided with an annular axially inwardly extending shoulder which bears against the outer race of the outer bearing 25 and the outer bearing 26, respectively. The axially outer bearings 25 and 26 serve to support their shafts against radial loads, whereas the axially inner bearings 25 and 26 sustain both radially and axial forces imposed upon their respective shafts.

Figure 4:
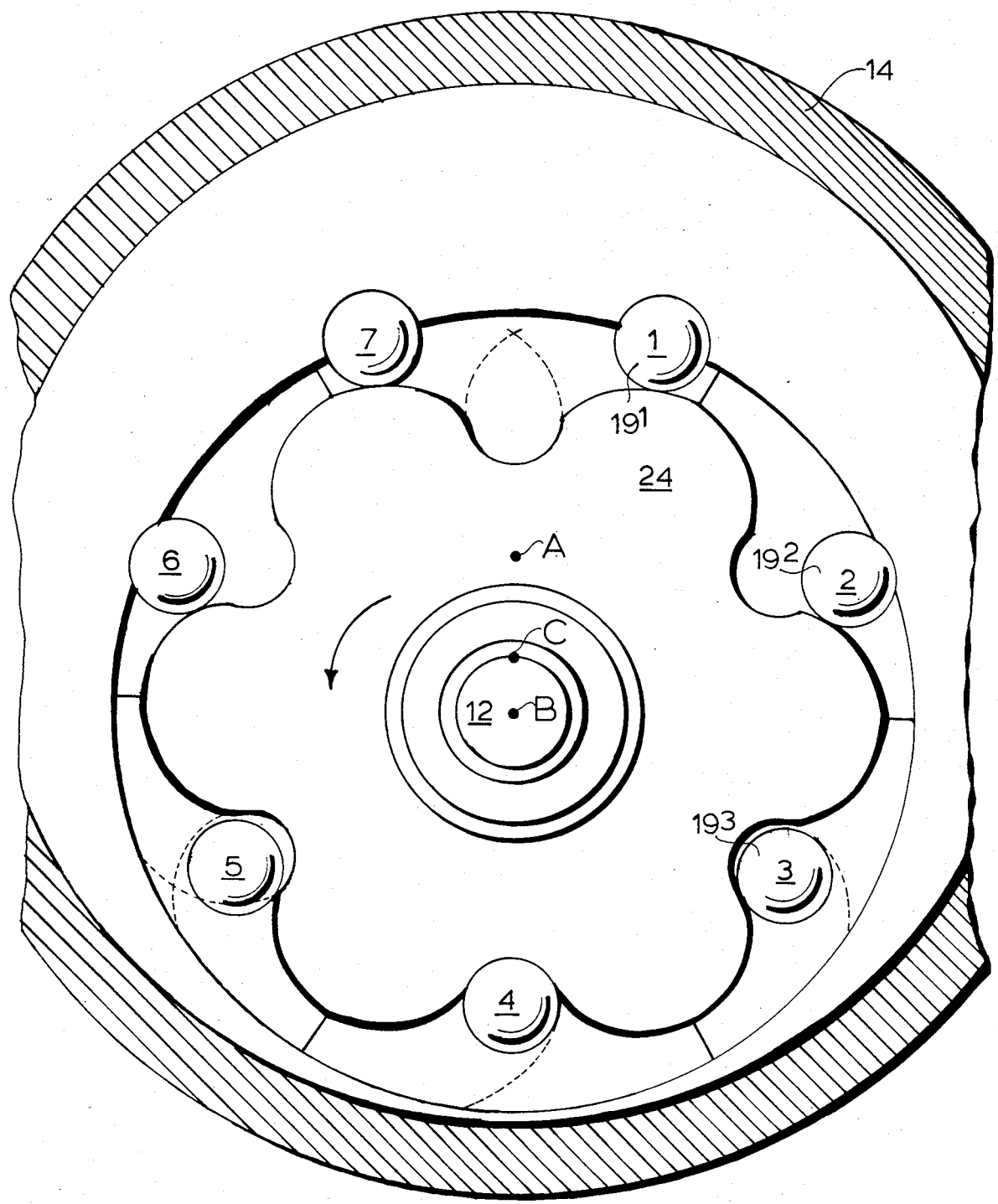
FIG. 4 is a view in transverse section taken along the line 4—4 looking in the direction of the arrows in FIG. 1.
Figure 5:
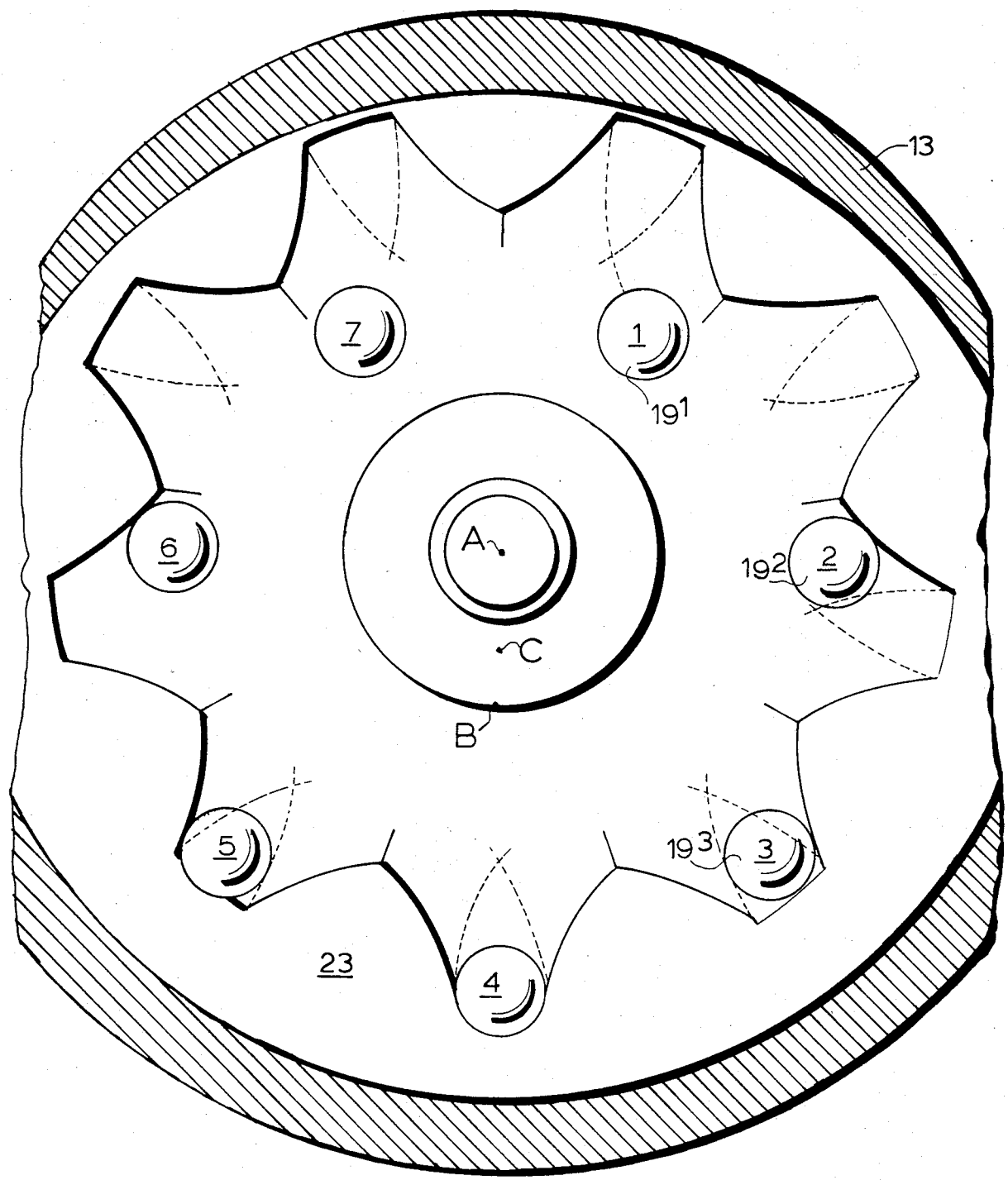
FIG. 5 is a view in transverse section taken along the line 5—5 looking in the direction of the arrows in FIG. 1.

In the axially inner or front surface of transmission member 24 there are disposed six equally angularly spaced epicycloidal grooves 22. The axially inner face of transmission member 23 is provided with nine equally angularly spaced hypocycloidal grooves 21. Between the confronting axially inner faces of transmission members 23 and 24 there is disposed parallel thereto a cage member 30 having seven equally angularly spaced holes therein disposed on a circle, each of such holes containing a transfer element 19 in the form of a ball. In FIGS. 4 and 5 the balls are designated $19^1$, $19^2$, $19^3$, $19^4$, $19^5$, $19^6$, and $19^7$. The balls 19 are partially received within the grooves 21 and member 23 and 22 and member 24. As above explained, the guide cage or guide gear 30 is mounted for rotation about a fixed axis; such axis is designated C—C in FIGS. 1, 2 and 3, and C in FIGS. 4 and 5.

Figure 2:
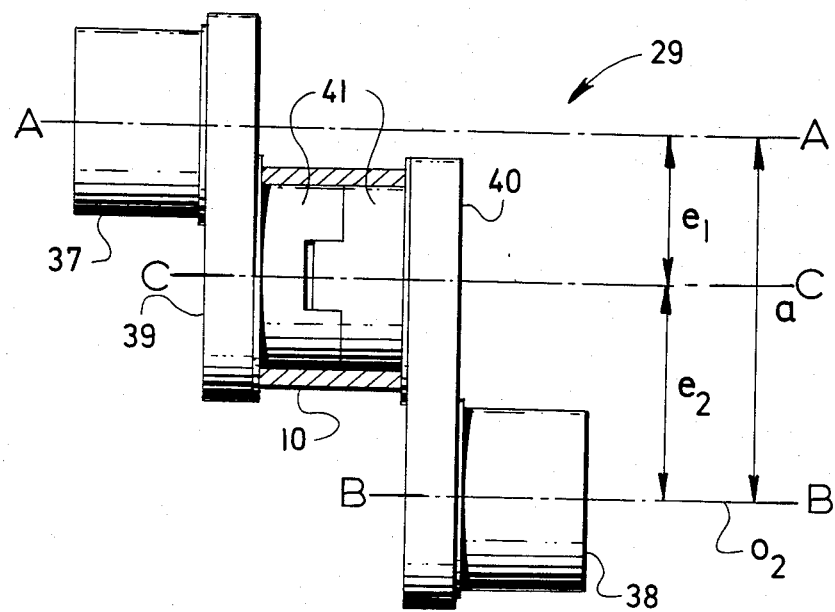
FIG. 2 is a view in side elevation and on an enlarged scale of the cage guiding assembly shown in FIG. 1.

The guide gear 29 shown in FIGS. 1 and 2 consists of a cage 30 in the form of a thin circular disc with a stiffened central hole therein within which there is disposed a sleeve or bushing 10. Within the bushing 10 there is disposed a two-part internal guide pin 41. From one end of the internal guide pin there extends a crank arm on the outer end of which there is disposed a first stabilizing pin 37, and from the other end of the internal guide pin 41 there extends a second crank arm from which there extends in the direction opposite to pin 37 a second stabilizing pin 38. Stabilizing pin 37 is mounted in a ball bearing 28 disposed in a recess in transmission member 24, whereas stabilizing pin 38 is disposed in a ball bearing 27 mounted in a recess in transmission member 23.

It will be seen that the internal guide pin 41 is disposed on an axis C—C which is parallel to the axis A—A of both shaft 11 and of stabilizing pin 37, whereas stabilizing pin 38 is disposed coaxial of shaft 12 on axis B—B. As shown in FIG. 2, axis A—A lies a distance $e_1$ from axis C—C, whereas axis B—B lies a distance $e_2$ from axis C—C.

Figure 3:
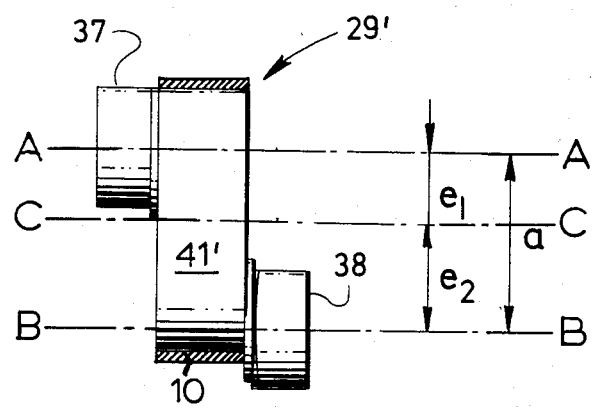
FIG. 3 is a view in side elevation of an alternative embodiment of cage guiding assembly.

In FIG. 3 there is shown a one-piece guide gear 29' which is generally similar to guide gear 29 of FIG. 2 with the exception that the part of the guide gear extending between the stabilizing pins 37 and 38, designated 41', is in the shape of a body of revolution which is received within the bushing 10 disposed within the guide plate 30.

The manner of interaction between driving transmission member 23, transfer elements 19, and driven transmission member 24 will be more clearly understood upon consideration of FIGS. 4 and 5. In such figures seven successive balls or transfer elements 19, designated $19^1$, $19^2$, $19^3$, and then simply 4–7, incl., are shown interposed in driving engagement between transmission members 23 and 24.

The above-described transmission operates as follows.

Transmission member 23, rotated by the driving shaft 11, exerts pressure upon transfer elements 19. Through the transfer elements 19 this pressure is transferred in orbits to the functional surfaces of the transfer grooves 22 of transmission member 24. The action component of this pressure is taken up by the bearings 25 and 26.

The circumferential component of the pressure between members 23 and 24, as transmitted by the balls 19, causes the rotation of the driven transmission member 24 and the driven shaft 12. It is to be noted that in the construction shown the transmission drives the shaft 12 at a faster speed than the driving shaft 11. When both transmission members 23 and 24 rotate in the transfer grooves 21, 22 rolling and mating transfer elements 19 maintain their original circular configuration by reason of their being mounted in the seven equi-angularly spaced holes in the member 30. The member 30, which constitutes a guide cage or guide gear rotates about a fixed axis C—C. The direction of rotation of members 23, 30, and 24 is the same for all such members. The transfer elements 19 which are found in extreme positions and in cross points of the transfer grooves 21, 22 are displaced by the rotating cage 30 from zones in which they engage transmission members 23 and 24 to zones in which they are out of contact with at least one of said transmission members 23, 24.

It is to be noted that the arrangement of the guide gear according to the invention permits the substitution of other guide gears therefor whereby the distances $e_1$ and $e_2$ may be changed. The speed ratio i between the drive shaft 11 and the driven shaft 12 is calculated as follows:

$$i = Z_2/Z_1 = 6/9 = 0.66$$

where
- $z_1$ is the number of grooves in the driving transmission member 23, and
- $z_2$ is the number of grooves in the driven transmission member 24.

It should be noted that this is a speed increasing gear transmission, that is, the driving shaft 11 rotates at a speed which is only 0.66 that of the driven shaft 12.

Although the invention is illustrated with reference to a plurality of embodiments thereof, it is to be expressly understood that it is in no way limited to such preferred embodiments but is capable of numerous modifications within the scope of the appended claims.

We claim:

1. A gear equipment for transmitting rotating motion, comprising a first and a second parallel confronting disc-like transmission member rotating about parallel offset axes, the confronting faces of the transmission members being provided with face transfer grooves in which there are positioned anti-frictionally disposed transfer elements, in the form of balls, a guide gear including a guide plate which is disposed between the transmission members and which retains the balls uniformly spaced angularly in a circle, and means mounting the guide plate for rotation about a fixed axis parallel to said axes of the transmission members.

2. Gear equipment as claimed in claim 1, wherein the fixed axis about which the guide plate rotates is parallel to the said offset axes about which the transmission members rotate.

3. A gear equipment for transmitting rotating motion, comprising a first and a second parallel confronting disc-like transmission member rotating about parallel offset axes, the confronting faces of the transmission members being provided with face transfer grooves in which there are positioned antifrictionally disposed transfer elements, in the form of balls, a guide gear including a guide plate which is disposed between the transmission members and which retains the balls uniformly spaced angularly in a circle, and means mounting the guide plate for rotation about a fixed axis parallel to said axes of the transmission members, the fixed axis about which the guide plate rotates being parallel to the said offset axes about which the transmission members rotate, and the means mounting the guide gear for rotation about a fixed axis comprises a member in the form of a double crank shaped member having a central pin from the opposite ends of which there extend members including oppositely directed first and second stabilizing pins parallel to the central pin, the central pin being journalled in an intermediate part of the guide plate, the first stabilizing pin being journalled in the first transmission member, and the second stabilizing pin being journalled in the second transmission member.

4. Gear equipment as claimed in claim 3, wherein the stabilizing pins are disposed on the outer end of radial arms extending from the opposite ends of the central pin of the double crank shaped member.

5. Gear equipment as claimed in claim 4, wherein the central pin is made up of two coaxial pieces which are keyed together.

6. Gear equipment as claimed in claim 3, wherein the stabilizing pins extend directly from the central pin and are disposed on opposite sides of and parallel to the axis of the central pin.

* * * * *